United States Patent [19]

Wright

[11] 4,304,189

[45] Dec. 8, 1981

[54] TELESCOPIC LAUNCH AND RETRIEVAL CHUTE

[75] Inventor: Herbert H. Wright, Washington, D.C.

[73] Assignee: The United States of America as represented by the Secretary of the Navy, Washington, D.C.

[21] Appl. No.: 88,264

[22] Filed: Oct. 25, 1979

[51] Int. Cl.³ .............................................. B63B 21/16
[52] U.S. Cl. .................................. 114/254; 114/244; 114/242; 244/1 TD
[58] Field of Search ........ 114/312, 313, 322, 326–329, 114/336, 242, 244, 245, 253, 254; 244/1 TD; 273/359–361

[56] References Cited

U.S. PATENT DOCUMENTS

| | | | |
|---|---|---|---|
| 2,137,450 | 11/1938 | Green | 244/1 TD |
| 2,364,637 | 12/1944 | Lear | 244/1 TD |
| 2,502,650 | 4/1950 | Harris | 244/1 TD |
| 3,298,347 | 1/1967 | Swain | 114/244 |
| 3,722,452 | 3/1973 | Wynn | 114/244 |
| 3,943,875 | 3/1976 | Sanders | 114/244 |
| 3,961,589 | 6/1976 | Lombardi | 114/244 |
| 3,966,171 | 6/1976 | Hale | 114/244 |

*Primary Examiner*—Edward R. Kazenske
*Assistant Examiner*—D. W. Keen

[57] ABSTRACT

Apparatus, such as a chute or boom, attached to the stern of a ship permits a towed body to be launched and retrieved without damaging the hull of the ship. The chute includes a plurality of telescoping sections coupled to one another through a locking and release mechanism operated by a cable assembly. In a preferred embodiment, launch contemplates extension of the chute and activation of the cable assembly so that the chute telescopes open to a locked full extension. The towed body may then be released through the chute to its towing position. Retrieval involves first recapturing the towed body and drawing it up through the chute into the ship and then activating the cable assembly and retracting the chute so that the chute is telescopically folded back to its initial position with the towed body stowed in the chute ready for its next launch.

1 Claim, 8 Drawing Figures

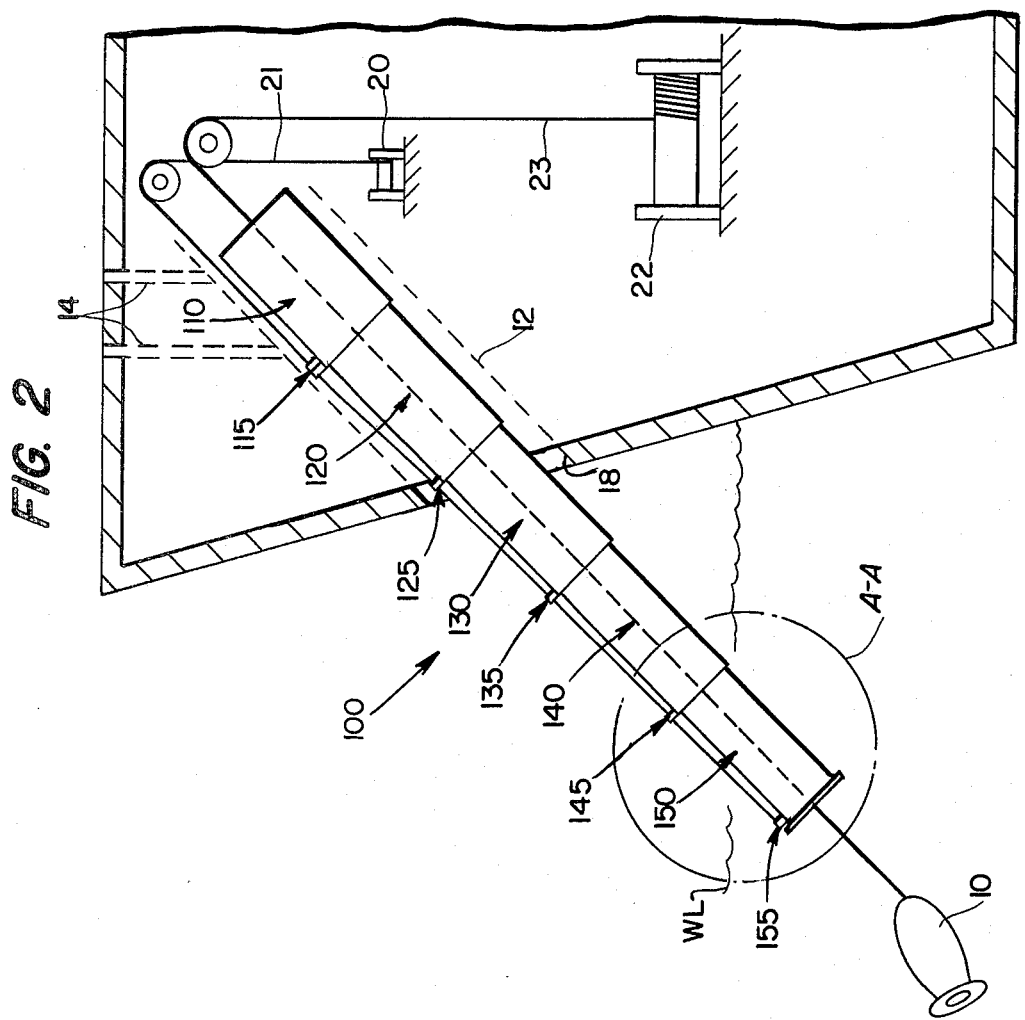
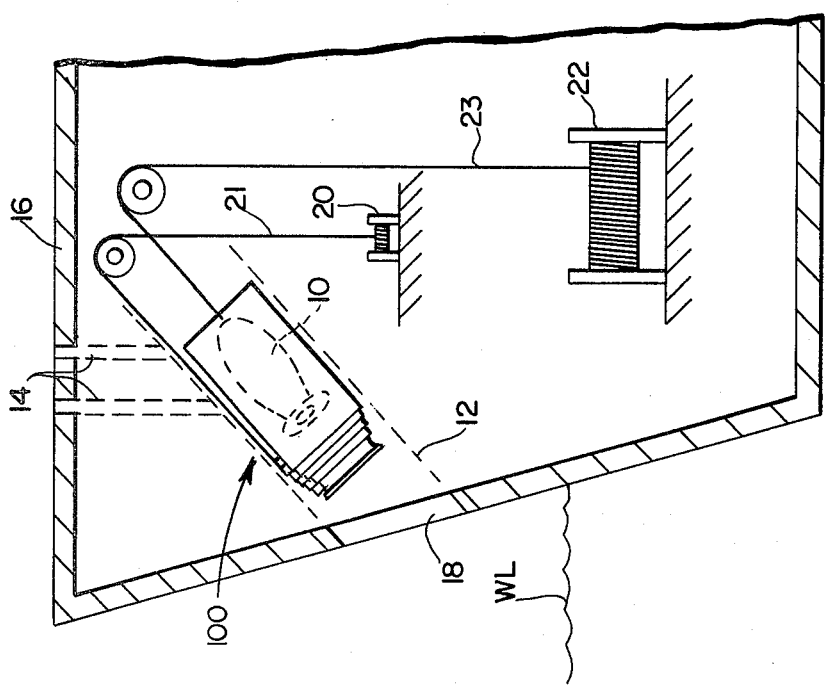
FIG. 2
FIG. 1

TELESCOPIC LAUNCH AND RETRIEVAL CHUTE

BACKGROUND OF THE INVENTION

This invention relates to towed vehicles and more particularly to apparatus for the launch and retrieval of towed vehicles.

In the past, launching and retrieval apparatus has been employed for a variety of towed objects. The present apparatus has been developed primarily for towing underwater craft or "fish", containing sonar equipment arrays. Traditionally significant areas of concern have included the location of fish stowage on the launching craft, as well as the manner of launch and retrieval. As to the latter, damage to the fish, the delicate equipment inside, and the stern of the ship, tends to ultimately render use of apparatus of this kind cost prohibitive. And on smaller ships, retrieval procedures also require excessive manpower at least one observer and two line handlers. The line handlers, coordinated and guided by the observer, must slowly pull the towed device to the ship until the line is nearly vertical and virtually motionless. When the amplitude of the tow cable pendulum motion is minimized, the line handlers raise the device and stow it on board. This procedure is greatly limited by its dependence on experienced crews, good visibility, close teamwork, wave action, and ship motion.

SUMMARY OF THE INVENTION

Accordingly, the present invention provides for apparatus, such as a boom or chute, projecting from, and attached to, the stern of a ship such that a towed body may be launched and retrieved through the chute without inflicting damage to the hull of the ship. The chute includes a plurality of telescoping sections and is releasably secured to the ship in a folded or collapsed state. Through a cable and winch arrangement, the chute telescopes open to full extension for launch and retrieval, and is pulled back and collapsed for storage when not in use. The chute sections are all coupled by the cable, and adjacent sections are joined by pin assemblies. Each of the sections includes a groove extending longitudinally along the outer surface of one section and a spring-biased pin on the adjacent end of the larger diameter section. Each pin includes a cable-engaging portion on one end and a locking portion on the other end. The locking portion is biased into locking engagement with a locking aperture disposed in the slot. When chute extension occurs, the chute winch is activated so that the cable holding the sections in the folded position is released, and upon full extension, the locking portions of the pins of adjacent sections are spring-driven into locking engagement with respective locking apertures in the slots. The object to be towed is then launched through the extended chute into the water. Retrieval of the object may be accomplished in one of two ways. A first involves drawing the body through the chute into the ship, and then activating the winch so that the cable is reeled in. In this way, tension imparted to the cable acts on the cable-engaging portion of the pins to extract them from the locking apertures in which they are disposed. When all the pins have been extracted, the chute sections are telescopingly collapsed when the cable is further reeled in with the towed object stored concentrically within the chute ready for its next launch. A second involves drawing the towed body into the lowermost section of the chute at which time the chute winch is activated. Both the towed body and the chute are then drawn, at the same rate of movement, back into the ship, the telescopic chute collapsing about the towed body as it is retracted.

OBJECTS OF THE INVENTION

It is therefore an object of this invention to provide apparatus for launching and retrieving a towed vehicle so that damage to the towed vehicle is minimized.

Another object is to provide a telescoping chute on a water craft which can be extended for launch and retrieval of, and collapsed for storage of, a towed vessel.

Still another object is to provide remotely actuated means for locking and unlocking adjacent sections of a collapsible, telescopic chute.

Yet another object is to provide telescopingly arranged chute sections which are simultaneously lockable into full extension and simultaneously unlockable for collapse.

BRIEF DESCRIPTION OF THE DRAWINGS

Other objects and many of the attendant advantages of this invention will readily be appreciated as the same becomes better understood by reference to the following detailed description when considered in connection with the accompanying drawings in which like reference numerals designate like parts throughout the Figures thereof and wherein:

FIG. 1 is a schematic view of the cone chute of the present invention collapsed in the stern of a ship with a towed body stored therein;

FIG. 2 is a schematic view of the cone chute of the present invention fully extended from the stern of a ship into the water with the towed body being launched or retrieved;

DETAILED DESCRIPTION OF THE INVENTION

Figure 3:
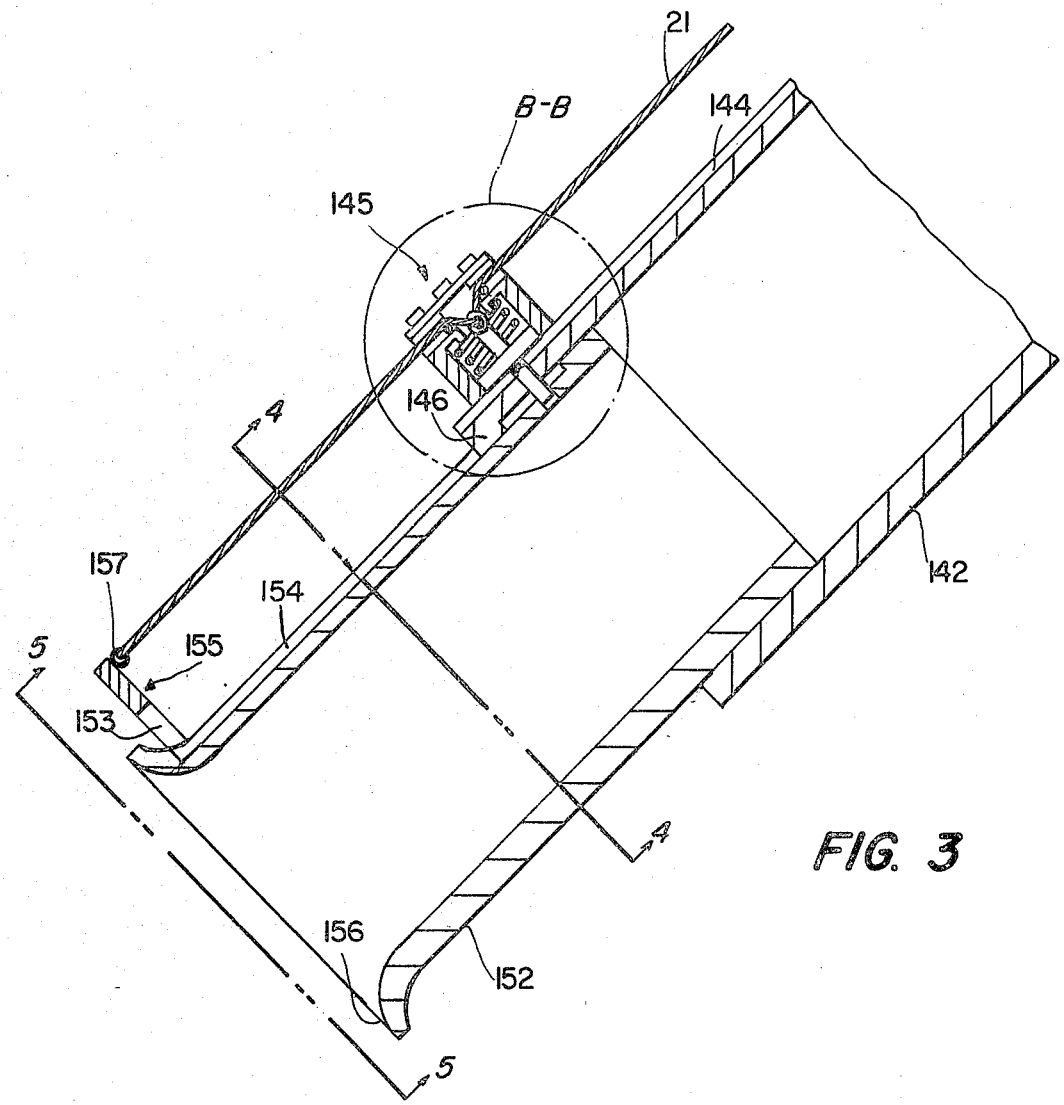
FIG. 3 depicts an enlarged cross-sectional view of the cone chute taken at the region marked A—A in FIG. 2.

Referring now to the drawings wherein like reference characters designate like or corresponding parts throughout the several views, FIGS. 1 and 2 illustrate the telescopic chute of the present invention in position at the stern of a ship in collapsed, and fully extended, positions, respectively. Internally of the stern is a downwardly angled tube 12 supported from upper deck 16 by supporting brackets 14. Tube 12 opens toward the sea at opening 18, the tube and opening both having a diameter large enough to receive and store telescopic cone chute 100. Chute 100 is cylindrical and is attached to winch 20 by cable 21 so that unwinding of the cable from the winch results in extension of the chute as shown in FIG. 2. Similarly, towed body 10 is stored within chute 100 and attached by cable 23 to winch 22. Upon unwinding cable 23 from winch 22, towed body 10 translates through chute 100 toward and below the surface of the sea WL. When chute 100 is fully extended, each of a plurality of sections latches with its adjacent section. As shown in FIG. 2, sections 110, 120, 130, 140 and 150 each include respective stations 115, 125, 135, 145, and 155. Each of these sections provide not only the latching mechanism but also the unlatching mechanism.

FIG. 3 depicts region A—A of FIG. 2 and shows the last two sections of chute 100 in relative extension. The upper and lower sections include channels 144 and 154, respectively. The upper section also includes radially inward-directed projection 146 which sits in channel 154 of the lower section and acts to maintain the same radial orientation between stations 145 and 155. Channels 144 and 154 extend longitudinally along the entire outer surface of their respective sections, from one end to the other, the channel in the lowermost section extending through flange 156 as well. Station 155, positioned at the outer end of the lowermost section, includes securing element 157 to which cable 21 is secured. Station 155 is a plate including rectangular opening 153 extending from the middle of the plate to the edge adjacent channel 154. At this point, the plate is affixed to wall 152 of the lowermost section. The opening is situated directly above channel 154 and is large enough to permit projection 146 to extend therethrough when the sections are collapsed.

Figure 4:
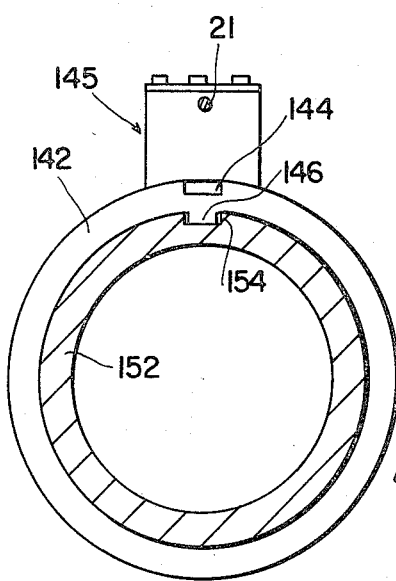
FIG. 4 is a cross-sectional view of the cone chute taken along lines 4—4 in FIG. 3.
Figure 5:
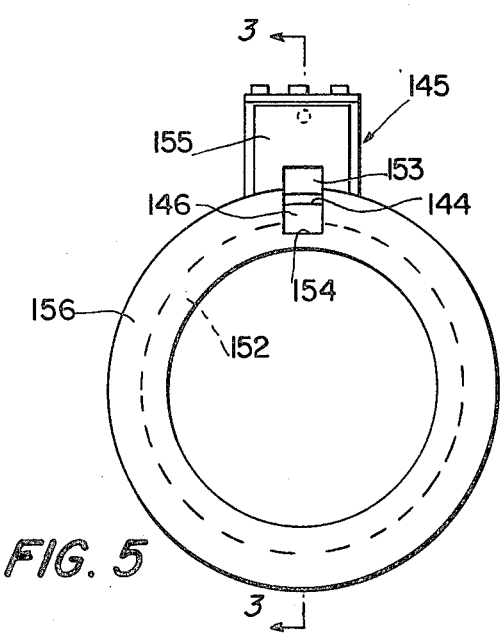
FIG. 5 is an end view of the present cone chute taken along line 5—5 in FIG. 3.

FIGS. 4 and 5 are cross-sectional views taken along lines 4—4 and 5—5 of FIG. 3, and illustrate the positioning of projection 146 in channel 154. This alignment insures polarization of adjacent sections, so they do not rotate relative to one another thereby placing undue stress on the cable or the stations to which the cable is attached.

FIG. 5 shows the opening 153 of station 155 disposed directly above channel 154 with projection 146 placed therein.

Figure 7:
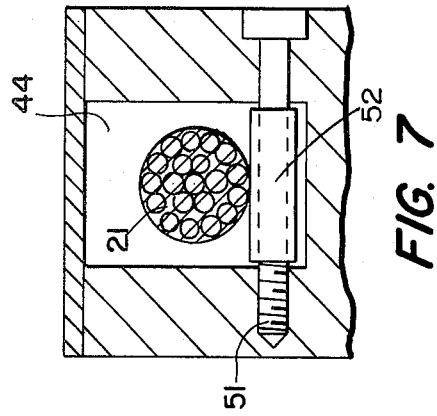
FIG. 7 depicts a cross-sectional view of the roller bearing assembly for the cable taken along line 7—7 in FIG. 6.
Figure 8:
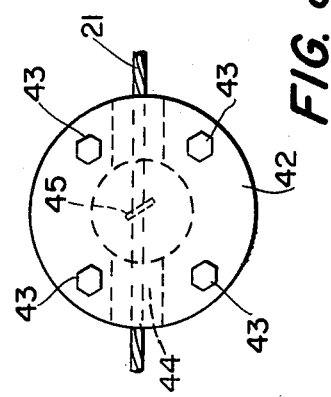
FIG. 8 is a cross-sectional view of the locking mechanism of FIG. 6 taken along line 8—8.
Figure 6:
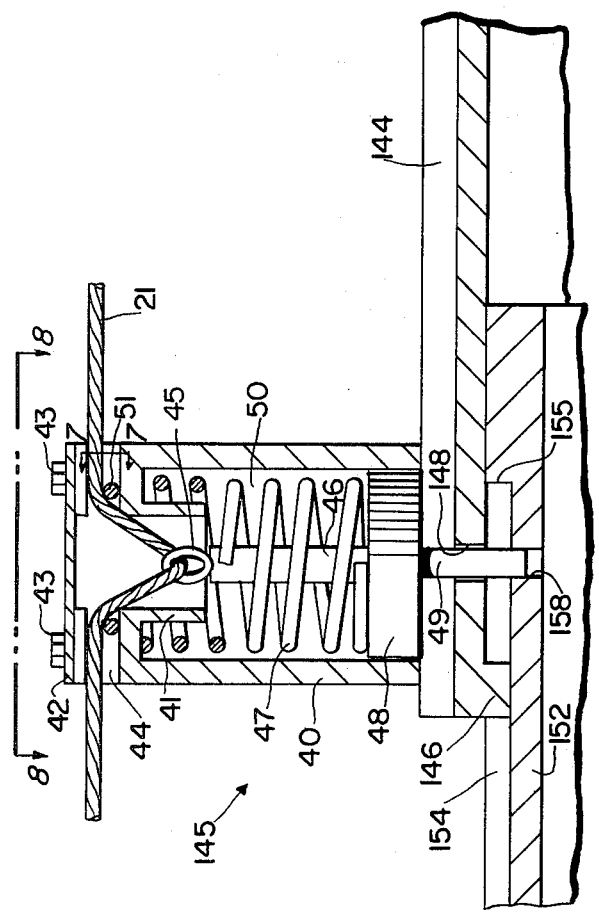
FIG. 6 is an enlarged cross-sectional view of the locking mechanism positioned between adjacent telescoping chute sections, taken at the region marked B—B in FIG. 3.

FIGS. 6-8 illustrate region B—B of FIG. 5, and present a more detailed view of a typical latching and unlatching station. Station 145 is located on the outer end of its respective supporting section, the latter receiving the upper end of the adjacent section. This end includes channel 154 termination in an abutment 155 so that relative travel between the two sections to a fully extended position is limited. Also adjacent the upper end of section wall 152 is latching opening 158 for receipt of a latching pin 49 associated with station 145. The station includes cylindrical housing 40 mounted on the lower end of section wall 146 and projecting outwardly therefrom. At the outermost side of housing 40 is plate 42 fastened thereto by a plurality of removable bolts 43. Plate 42 and the outermost side define between them a diametrically extending open area or channel 44 extending parallel to channel 144, and through which cable 21 passes. Cable 21 runs from station to station, as illustrated in FIG. 2. FIG. 6 illustrates cable 21 passing through channel 44, from the right, and over bushing 51. This is more clearly shown in FIG. 7 where sleeve 52 is freely rotatably disposed upon the mounting bolt. The cable 21 then passes down through loop 45, back up to the opposing channel 44 over the bushing located therein, and out of the channel toward station 155 where it is fixedly attached (note FIG. 3). Loop 45, to which cable 21 is attached interiorly of housing 40, is located at the outermost end of shaft 46. Piston 48 is positioned inside housing 40 for travel along the longitudinal axis thereof. The piston includes shaft 46 which disposed concentrically atop the piston opposite channel 144 of the upper section. The pin 49 is of such a length as to extend through both wall locking aperture 148 of the upper section and wall 152 of the lowest section. Helical compression spring 47 is disposed concentrically about shaft 46 between piston 48 and collar 41 of housing 40, and acts to push the piston toward channel 144 of the upper section.

In operation, winch 20 is activated when it is desired to effect launch of towed body 10 and telescopic extension of chute 100. Cable 21 then feeds off the winch allowing the chute to expend to its full extension. As adjacent sections slide relative to one another, with the projection and pin of each outer section riding in the channel of the inner section, the latching opening of the rearward end of the inner section aligns itself under pin 49 on the piston underside. At such time as alignment occurs, pin 49 is forced into the inner section opening and the two adjacent sections are latched together. Winch 22 is then activated and towed body 10 is released from its storage position in section 110 of the chute and dropped therethrough beneath the surface WL of the sea.

When retrieval is desired, towed body 10 is pulled up into chute 100, by activation of winch 22 in a reverse manner, to its storage position in section 110. Once positioned there, winch 20 is activated so that cable 21 is wound thereupon. The tension force on cable 21 increases as it is drawn toward the reel, and is transferred to the piston through the loop 45 and shaft 46. When the pull on the shaft and piston overcomes the force exerted by the helical spring, the piston rises sufficiently so that pin 49 lifts out of the latching opening in the inner section. At such time, the sections are free to collapse one relative to another, and the cable begins to pull the sections together and into the stern of the ship through opening 18.

There has therefore been described a telescoping chute for launching and retrieving a towed body within the chute, so that damage to the body as well as the launch craft is avoided. The chute comprises a number of concentric telescoping sections connected together by a single cable and locking assemblies for locking the sections in full extension and unlocking the sections to then allow full collapse. When launching the towed body, the chute is telescopingly extended and locked and the body lowered through the chute into the sea. When the towed body is being retrieved, it is pulled up through the fully extended chute to a storage position. The locking assembly is then activated so that unlocking of the sections occurs. The sections may then be retracted.

The chute, constructed of plastic or metal, minimizes injury to the launch craft, and not only affords launch and recovery of towed vehicles with less manpower and greater safety for those handling the chute and towed body, but also facilitates launch and recovery in low visibility conditions as well as various wave activity and ship instability.

Obviously many modifications and variations of the present invention are possible in the light of the above teachings. It is therefore to be understood that, within the scope of the appended claims, the invention may be practiced otherwise than as specifically described.

What is claimed is:

1. Apparatus for launching and retrieving a towable body comprising:
   means for imparting reversible motion to said body;
   means for storing said body comprising a plurality of telescoping tubular sections and means for extending and retracting said sections after they are extended, said extending and retracting means including cable means attached thereto; and
   means for locking said sections in extended relation including pin means carried by each one of each pair of adjacent sections and a locking aperture carried by the other of the pair of adjacent sections, each of said pin means comprising a locking piston disposed normal to the launching direction of said body on said one of said each pair of adjacent sections, said piston being biased toward its respective locking aperture for engagement therewith when said storing means is fully extended, said piston including a pin portion for engagement in said aperture and a cable portion for engagement with said extending and retracting means,
   actuation of said imparting means causing said body to move through said storing means in a first, or launching, direction when said storing means is locked in full extension and in the opposite direction upon retrieval,
   actuation of said retracting means exerting a force on said retracting means parallel to said opposite, or retrieval, direction to move said pin portion out of biased engagement with said locking aperture so that release of each of said adjacent sections permits said force to telescopically collapse said storing means.

* * * * *